Oct. 22, 1929.  H. I. MORRIS  1,732,525
MACHINE FOR FABRICATING MATERIALS AND MAKING CARCASSES
Filed April 10, 1924   7 Sheets-Sheet 1
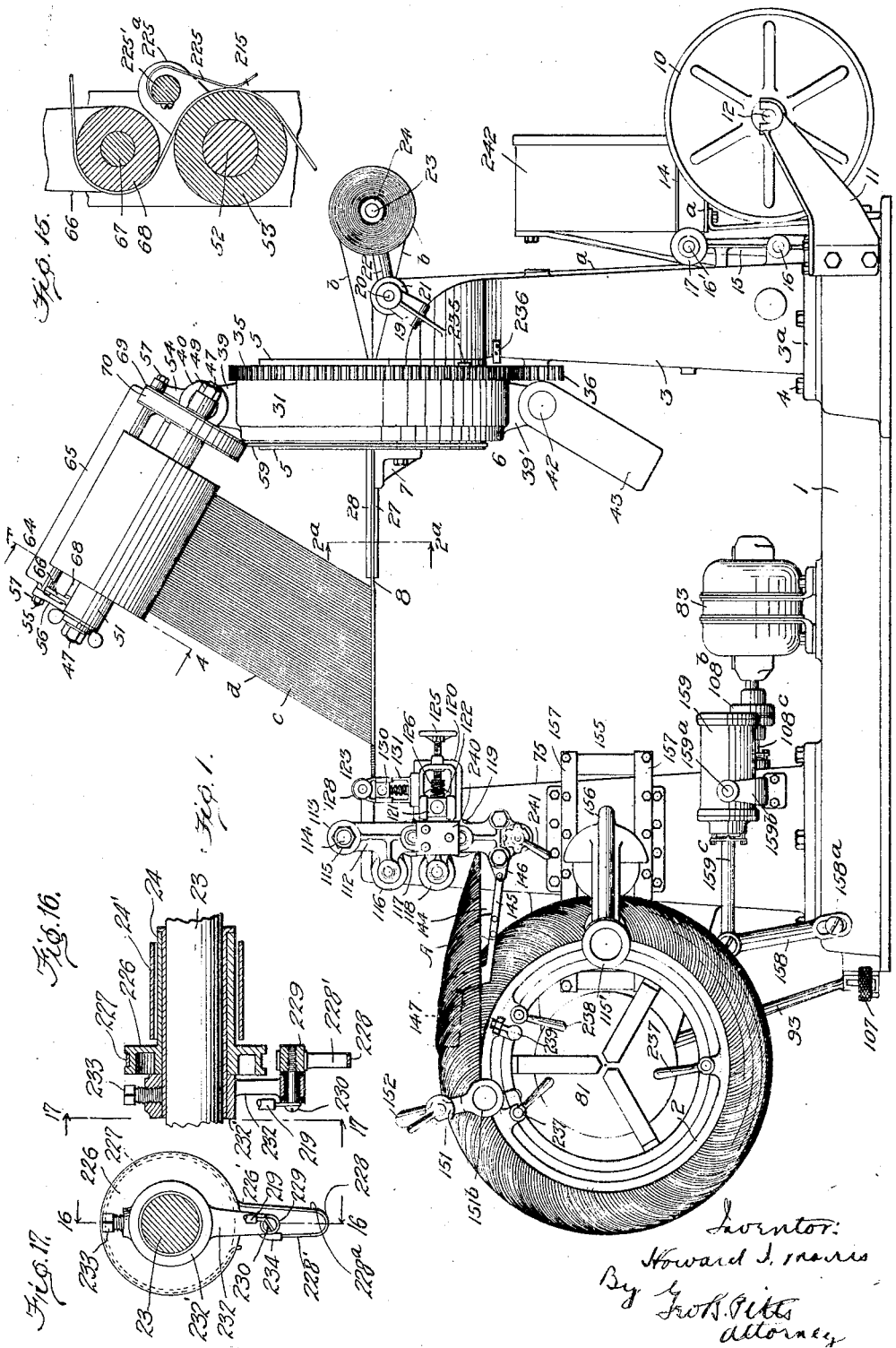

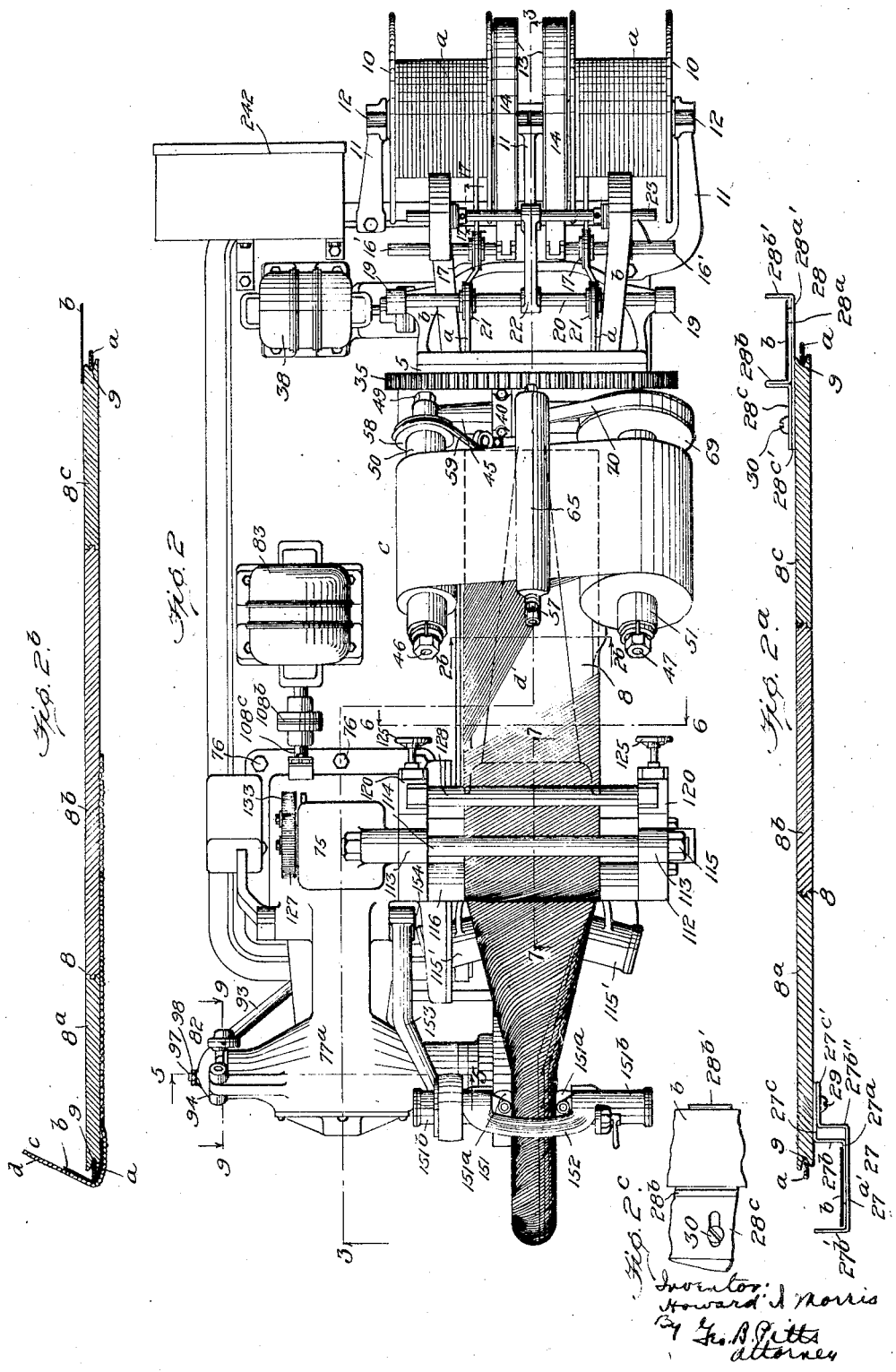

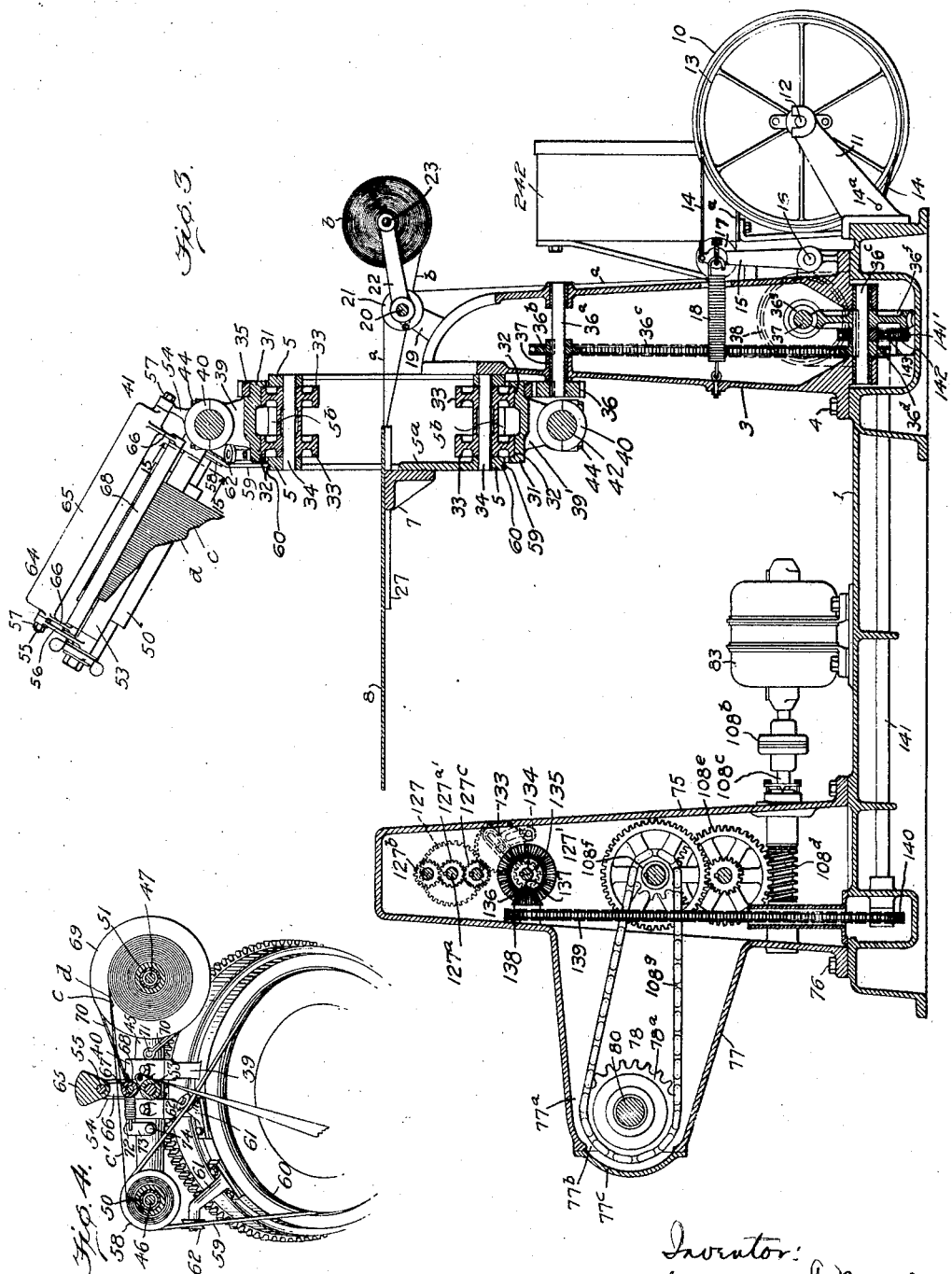

Oct. 22, 1929.  H. I. MORRIS  1,732,525
MACHINE FOR FABRICATING MATERIALS AND MAKING CARCASSES
Filed April 10, 1924   7 Sheets-Sheet 4
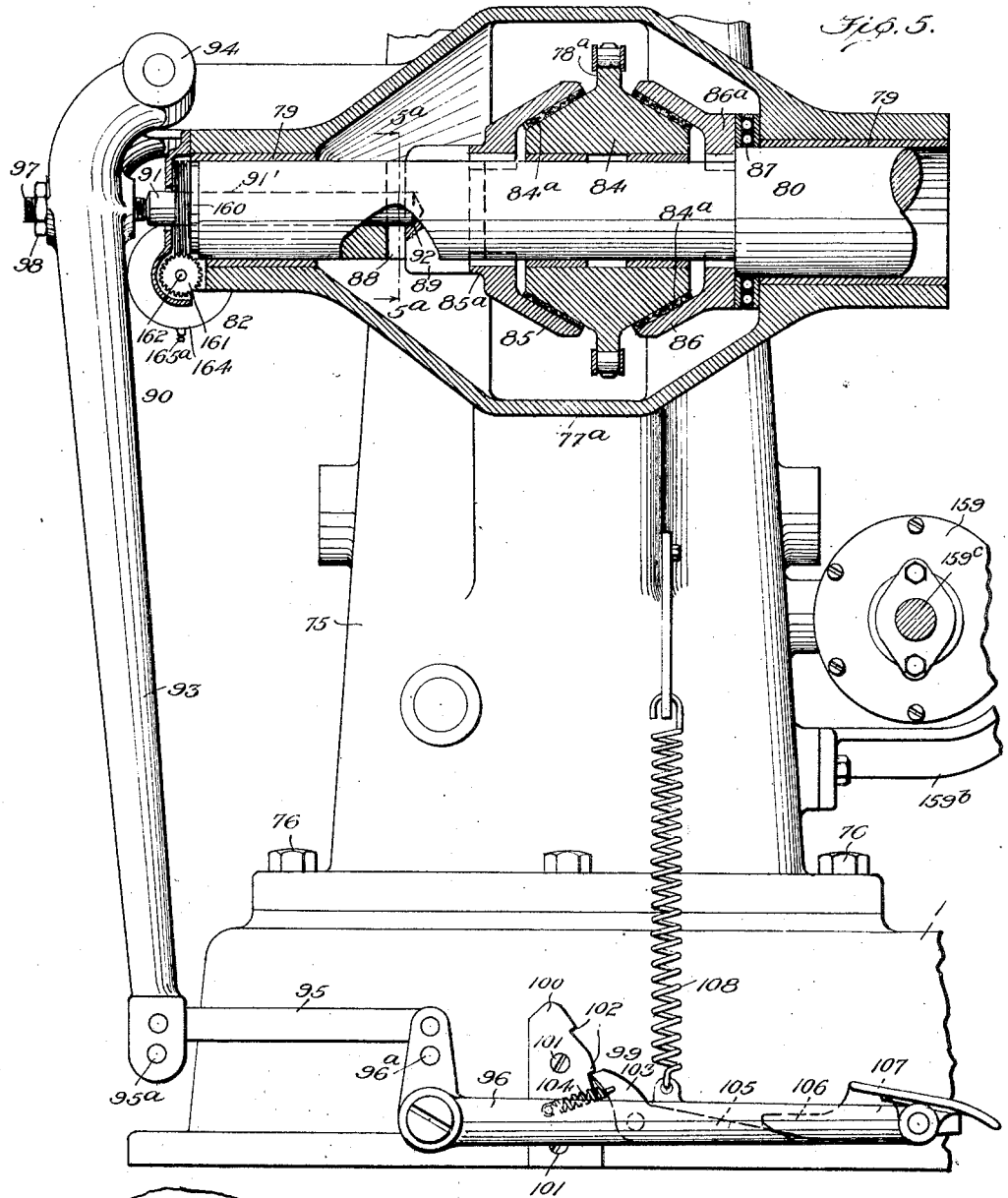
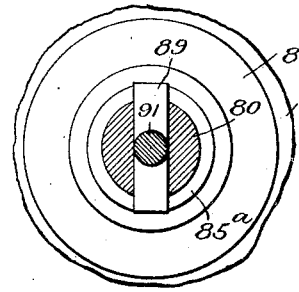
Inventor:
Howard I. Morris
By Geo. A. Pitts
Attorney Oct. 22, 1929.  H. I. MORRIS  1,732,525
MACHINE FOR FABRICATING MATERIALS AND MAKING CARCASSES
Filed April 10, 1924  7 Sheets-Sheet 5
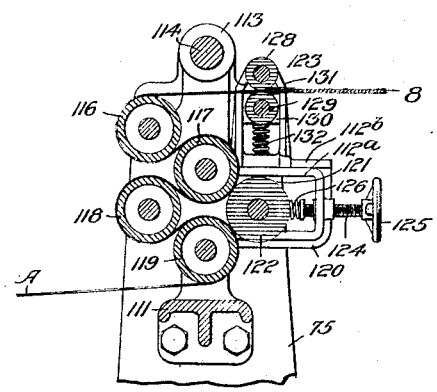
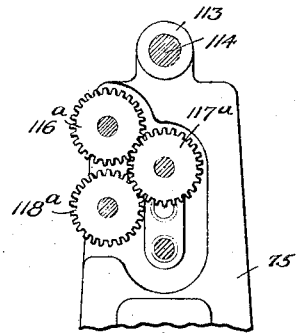
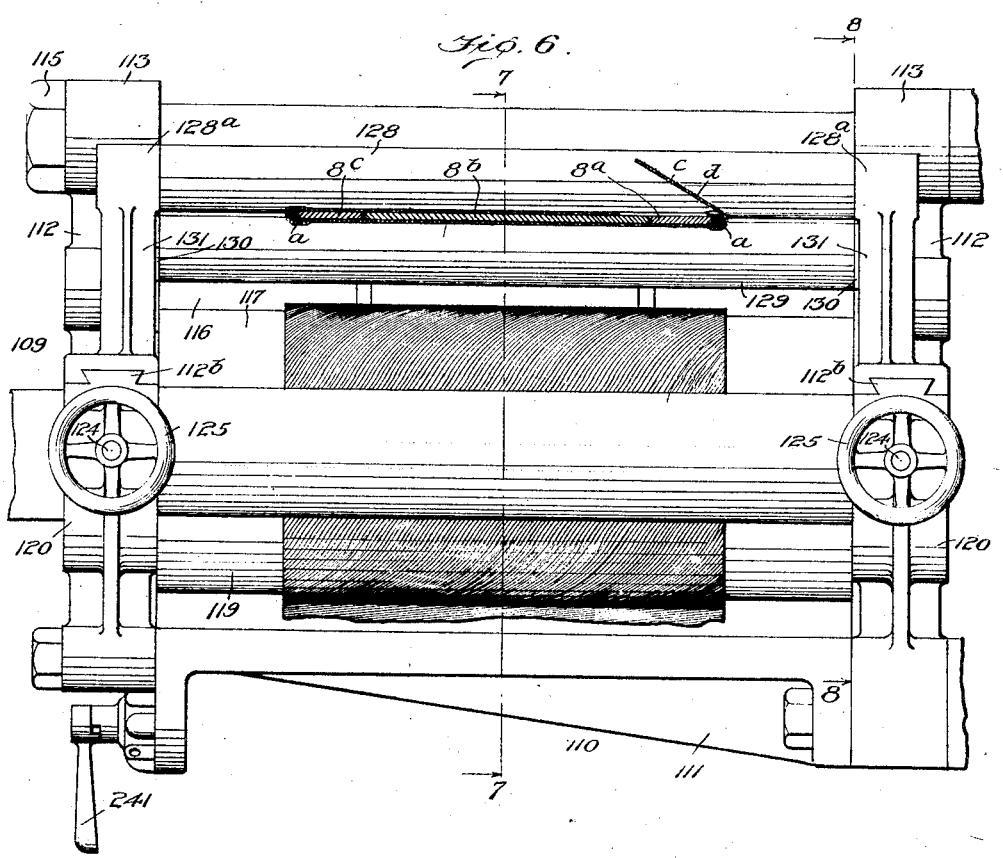
INVENTOR
Howard I. Morris
BY
Fred Witts
ATTORNEY

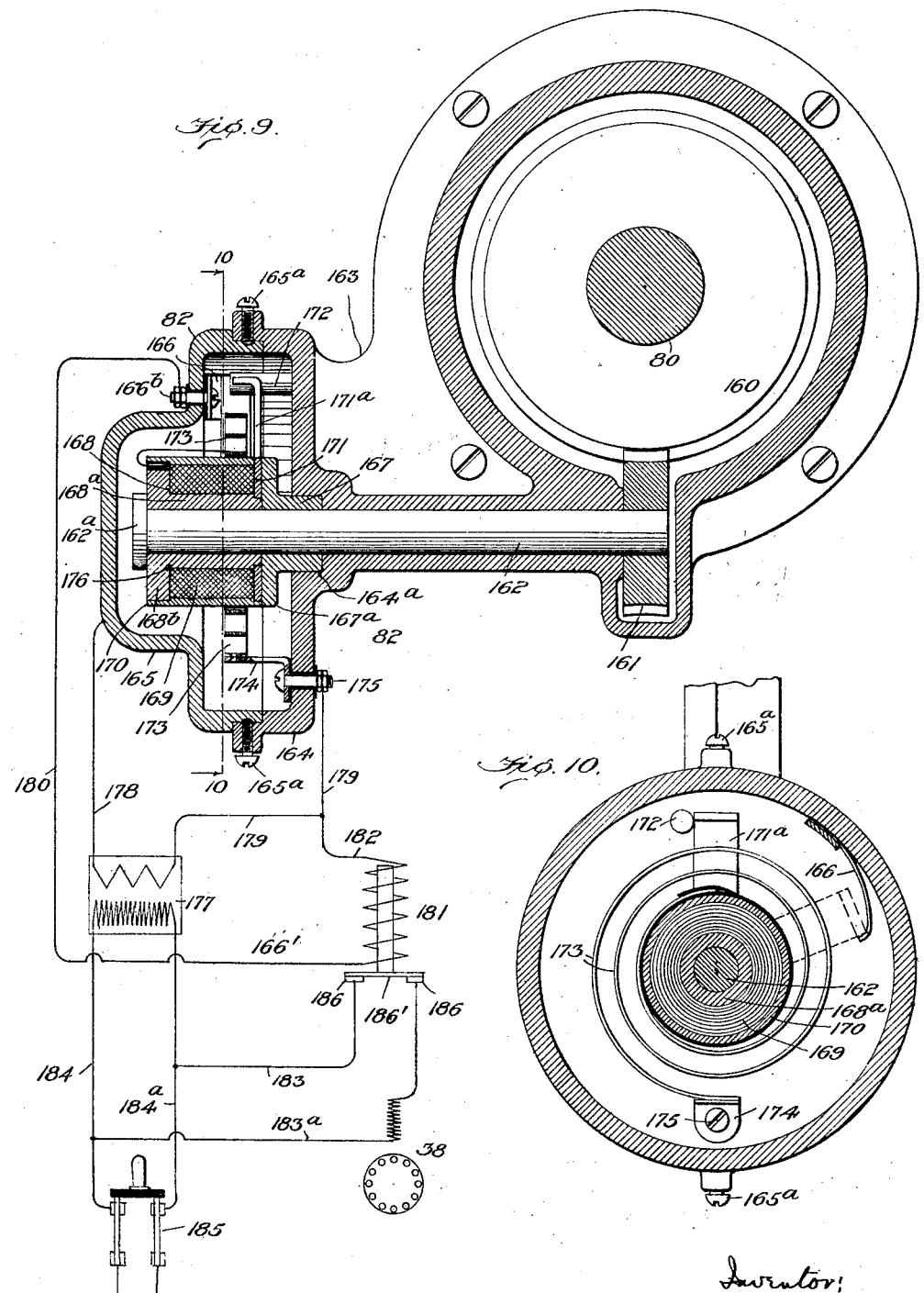

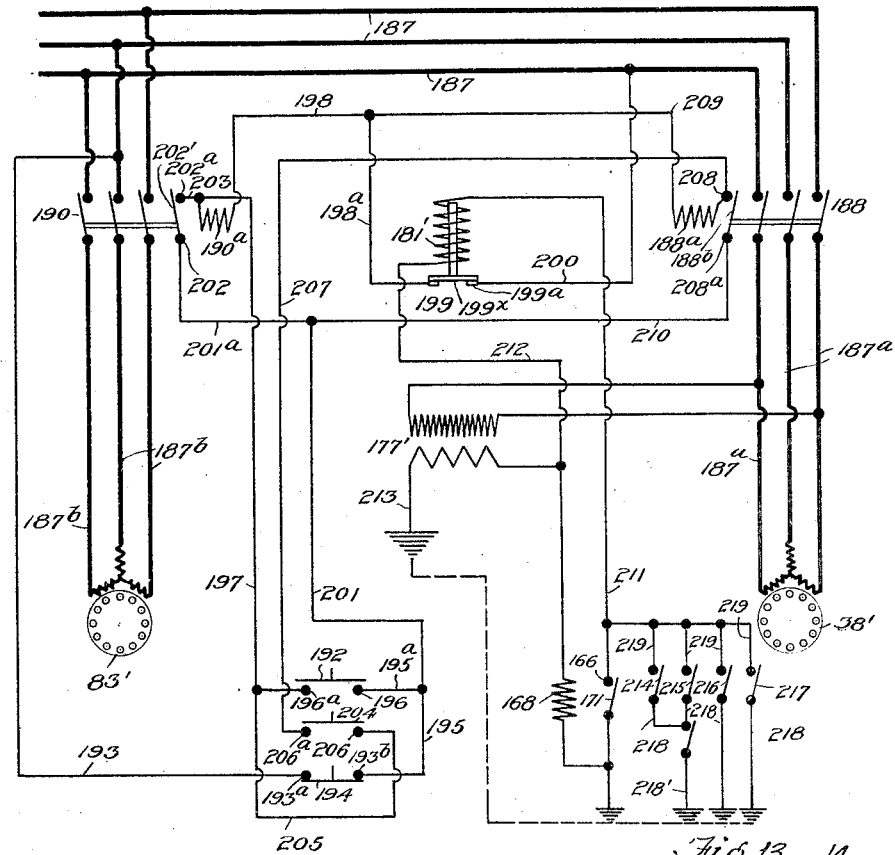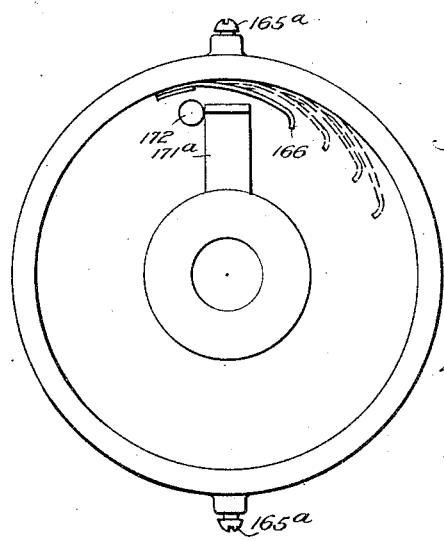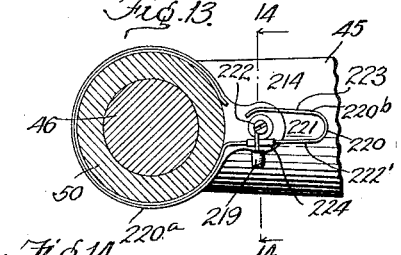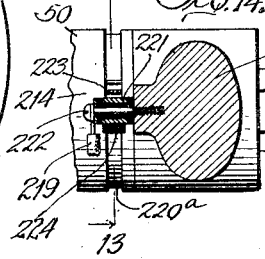

Patented Oct. 22, 1929

1,732,525

UNITED STATES PATENT OFFICE

HOWARD I. MORRIS, OF CLEVELAND, OHIO, ASSIGNOR TO THE CORD TIRE MACHINE COMPANY, OF CLEVELAND, OHIO, A CORPORATION OF ARIZONA

MACHINE FOR FABRICATING MATERIALS AND MAKING CARCASSES

Application filed April 10, 1924. Serial No. 705,654.

This invention relates to an apparatus for making tires or tire carcasses.

One object of the invention is to provide an improved machine adapted to fabricate the material of which the carcass is to be made and to wind such materials into carcass form in a rapid and economical manner.

Another object of the invention is to construct a machine of this character of relatively few parts, whereby its manufacture and assembly is relatively cheap and simple and its operation simplified.

Another object of the invention is to construct an improved carcass material fabricating machine, wherein provision is made for making a composite web, of which the carcass is formed, of any desired width.

Another object of the invention is to provide in a carcass material fabricating machine, improved means for controlling the feed or paying out of certain of the materials.

Another object of the invention is to construct a machine of this character wherein provision is made for driving the carcass supporting means to control and regulate the tension on certain or all portions of the web as it feeds to such means.

Another object of the invention is to construct a machine of this character wherein improved means are provided for consolidating the materials into a final composite web, with its plies of frictioned cords smooth and in face to face relation throughout its body portion, to insure rapid winding of the carcass as well as uniformity in spacing, stretching and tensioning of the cords.

Another object of the invention is to provide improved means for stopping the machine automatically in the event the supply of certain of the materials ceases.

A further object of the invention is to provide in a machine for winding carcasses, a novel mechanism for limiting the rotation of the carcass supporting means, whereby the latter is automatically stopped after it has made any predetermined number of revolutions.

A further object of the invention is to simplify the construction and operation as well as to increase the output of the machine disclosed in my co-pending application Serial No. 434,244, filed December 31, 1921.

Other objects of the invention will be apparent to those skilled in the art to which my invention relates from the following description taken in connection with the accompanying drawings, wherein—

Fig. 1 is a side view of a machine, embodying my invention, for fabricating a composite web of material and winding the web on a core.

Fig. 2 is a top plan view of the machine.

Fig. 2ª is a section on the line 2ª—2ª of Fig. 1, enlarged.

Fig. 2ᵇ is a section on the line 2ᵇ—2ᵇ of Fig. 2, enlarged.

Figure 2ᶜ is a fragmentary plan view of parts shown in Fig. 2ª.

Fig. 3 is a section on the line 3—3 of Fig. 2.

Fig. 4 is a section on the line 4—4 of Fig. 1.

Fig. 5 is a section on the line 5—5 of Fig. 2, enlarged.

Fig 5ª is a section on the line 5ª—5ª of Fig. 5.

Fig. 6 is an enlarged fragmentary view, partly in section, on the line 6—6 of Fig. 2.

Fig. 7 is a section on the line 7—7 of Figs. 2 and 6.

Fig. 8 is a section on the line 8—8 of Fig. 6.

Fig. 9 is an enlarged fragmentary view, partly in section on the line 9—9 of Fig. 2 and partly diagrammatic, showing the means for limiting the rotation of the carcass supporting means or core.

Fig. 10 is a section on the line 10—10 of Fig. 9.

Fig. 11 is a view similar to Fig. 10, but showing the manner of adjusting certain elements of the limiting means.

Fig. 12 is a diagrammatic view of the limiting means wherein the drive for all parts of the machine is stopped upon the completion of each carcass.

Fig. 13 is a fragmentary section on the line 13—13 of Fig. 14 showing the limiting means which operate when the liner fails to wind on its roll.

Fig. 14 is a fragmentary section on the line 14—14 of Fig. 13.

Fig. 15 is a fragmentary section on the line 15—15 of Fig. 3 showing the limiting means which operate when the cord material gives out.

Fig. 16 is a section on the line 16—16 of Fig. 17.

Fig. 17 is a section on the line 17—17 of Fig. 16.

In the drawings, 1 indicates a base of any desired shape, but preferably of substantially L-shape to mount certain mechanisms of the machine in alignment with a core 2 on which each carcass is wound, this construction of base utilizing a minimum amount of metal in casting it and facilitating access to various parts of the machine.

3 indicates a standard, preferably comprising a hollow casting, having around its lower end flanges 3ª, which are secured to the lateral portion of the L-base in any desired manner, for example, by bolts 4. At its upper end the standard 3 is provided with a ring 5, which forms a bearing for a shuttle, indicated as an entirety at 6. The ring 5 is provided with inturned flanges 5ª. 7 indicates a bracket fixed in any well known way to the front flange 5ª of the ring 5, and supporting a horizontal guide or platen 8, which guides or supports the various tire forming materials as they are being associated for fabrication into a composite web A. The bracket 7 is arranged to support the platen 8 in the horizontal plane substantially cutting the axis of the shuttle 6, to insure uniform application of the materials delivered by the shuttle 6 and their association with those materials fed endwise of the platen in the manner to be later set forth.

The opposite side edges of the platen are formed with grooves 9, which form guides for beads or bead strands a. Each bead strand preferably comprises a relatively narrow flat band formed of woven or braided wire, wound on a drum or spool 10, from which it is supplied in the manner to be set forth. However, each bead may when desired consist of a single strand of wire or other material, or a plurality of wires or other material, twisted or otherwise fabricated into a strand that may be substantially round in cross section. 11 indicates a plurality of brackets preferably secured to and extending rearwardly of the base 1. The outer ends of the brackets 11 are provided with bearings which removably receive the opposite ends of a pair of shafts 12. As shown in Fig. 2, there are three brackets 11 and they are spaced so that the center bracket supports the adjoining ends of the shafts 12. The shafts 12 carry the spools 10. 13, 13, indicate brake wheels, each having fixed relation to one of the spools 10. 14, 14, indicate bands, each engaging one of the wheels 13, so as to retard the rotation of the spool 10, to prevent paying out of the bead strand too rapidly. Each band is fixed at one end in any suitable manner to the base 1, preferably to a pin 14ª. The other end of the band is fixed to the free end of a lever 15, fulcrumed at 16. The lever 15 is provided with a shaft 16', which carries a guide wheel or sheave 17 around which the bead strand a runs as it is supplied from the adjacent spool 10. 18 indicates a spring connected at one end to the standard 3. The other end of the spring is connected to the lever 15 and normally operates to wind the band 14 on the adjacent wheel 13 to brake the latter. As the bead strip or strand a runs around the sheave 17, it will be seen that the pull on the strand will tend to release the brake and thus permit the spool to pay out the strand, and as the pull decreases due to the increased paying out of the strand, the pull of the latter against the tension of the spring will decrease and thus permit the spring to act on the band. As a result of these operations the supply of the bead strands will be automatically controlled. 19 indicates a pair of arms projecting upwardly from the upper end of the standard 3. The outer ends of the arms 19 are provided with openings to removably receive and support the opposite ends of a rod 20. The rod 20 forms a shaft for a pair of guide sheaves 21, over which the bead strands a run to guide them through the ring 5 and shuttle 6 to the grooves 9. The sheaves 17 preferably slide endwise on the shaft 16 in order to accommodate themselves to the convolutions of the strands a as they unwind from the spools 10.

22 indicates a bracket fixed in any desired manner to the rod 20 and supporting at its outer end a shaft 23. The shaft 23 extends laterally in opposite directions from the bracket and supports cores or arbors 24 on which are convolutely wound the strips of material b in which the bead strands a are embedded in the fabricated web A. The rolls of strips b are positioned on the arbors 24. Each arbor 24 is preferably provided with one or more spring plates 24', which normally expand outwardly and engage the inner convolution of the strip so the roll will be connected to the arbor and cause its rotation as the strip feeds forwardly.

The strips b are preferably formed of rubber suitably compounded to become relatively hard when cured and flipper strips—formed from fabric—to one face of which the rubber is secured. The shaft 23 is arranged to support the arbors in position so that the strips b will be guided through the ring 5 to the platen 8 in alignment with the bead strands a. The arbors 24 preferably loosely rotate on the shaft 23, being held against endwise movement thereon by any suitable means.

27, 28, indicate guides for the embedding strips b carried by the platen 8 and arranged to support the strips in proper relationship to the strands *a* so that the strips *b* may be folded over or around the strands *a*, to embed them, in the manner to be later set forth. The guides 27, 28, are connected to the upper and lower surfaces of the platen and extend beyond the opposite side edges of the latter, as shown in Fig. 2ª, for a purpose which will later appear. Each guide consists of a horizontal portion and side walls, being preferably so constructed that the width of the horizontal portion may be varied to accommodate strips of different widths as desired. For this purpose, the guide 27 comprises a main plate having a bottom section 27ª, a side section 27ᵇ and foot 27ᶜ, and a secondary plate having a bottom section 27ª′ of greater length than the bottom section 27ª, outer and inner side sections 27ᵇ′, 27ᵇ″ and a foot 27ᶜ′. The feet 27ᶜ, 27ᶜ′, are formed with elongated slots, each slot in one foot registering with a slot in the other foot so that set screws 29 may extend thru registering slots and engage the platen to secure the plates thereto. The elongated slots permit (1) the plates to be adjusted laterally so that approximately one-half of the strip *b* will lie beyond the free edge of the adjoining bead strand *a* and (2) the secondary plate to be adjusted relative to the main plate to adjust the width of the guide. The guide 28 comprises a main plate having bottom section 28ª, a side section 28ᵇ formed by crimping the metal on longitudinal lines to provide an up-standing wall and a foot 28ᶜ, and a secondary plate having a bottom section 28ª′ and a side section 28ᵇ′, co-operating with the wall or side section 28ᵇ to form the outer and inner side walls for the guide and a foot 28ᶜ′. The feet 28ᶜ, 28ᶜ′, are formed with elongated slots, each slot in one plate being adapted to register with a slot in the other plate so that screws 30 may extend thru the slots and engage the platen 8 to secure the plates thereto. The elongated slots permit the plates to be adjusted laterally relative to the platen and also relative to each other for reasons similar to those already described in connection with the plates comprising the guide 27. The platen 8 is preferably so constructed that it may be made wider or narrower, as desired, to form the web A of the desired width. For this purpose I construct the platen of three longitudinal sections 8ª, 8ᵇ, 8ᶜ, the center one (8ᵇ) of which has side edges that converge toward one end of the section and the abutting edges of the outer sections 8ª, 8ᶜ are similarly shaped, so that the endwise movement of the center section relative to the side sections 8ª, 8ᶜ, will operate to position the latter farther apart or nearer together accordingly as the center section 8ᵇ is moved in one direction or the other. The abutting edges of the sections 8ª, 8ᵇ, and 8ᶜ, are formed with tongues and grooves (see Figs. 2ª and 2ᵇ) to insure the guiding and supporting of the center section. The means for securing the inner ends of the side sections 8ª, 8ᶜ, to the bracket 7 is of a character to permit their adjustment toward and from each other. The opposite side edges of the center section 8ᵇ are perfectly tapered toward its rear end, so that when the section is moved to its extreme inward position, as shown in Fig. 2, the side sections 8ª, 8ᶜ, will be spaced their greatest distance apart to form a web of the maximum width. Accordingly, by moving the center section 8ᵇ endwise outwardly, the side sections 8ª, 8ᶜ, may be adjusted toward each other to arrange their outer side edges at the desired spaced distance to form the web of the width determined upon. No claim for the construction of platen or guide is made herein since it forms part of the subject matter and is claimed in my co-pending application Ser. No. 666,720, filed October 5, 1923.

Of the shuttle 6, 31 indicates a ring member rotatably mounted on the ring 5. The ring member 31 is provided on its inner wall with spaced tracks 32 which engage sets of rollers or wheels 33 loosely mounted on shafts 34, each supported at its opposite ends in the side walls of the ring 5. The outer or peripheral wall of the ring 5 is formed with openings 5ᵇ (one being shown in Fig. 3) thru which the sets of rollers 33 extend for engagement with the tracks 32. 35 indicates a ring gear, fixed to the ring member 31 in any desired manner, and meshing with a pinion 36. The pinion 36 is fixed to a shaft 36ª, mounted in bearings, supported in the bosses 37 provided on the standard 3. The shaft 36ª is driven by any suitable gearing, preferably mounted in the standard 3, that shown comprising a sprocket wheel 36ᵇ, a sprocket chain 36ᶜ running over the wheel 36ᵇ and a sprocket 36ᵈ fixed to a shaft 36ᵉ, a worm gear 36ᶠ carried by the shaft 36ᵉ and a worm 36ᵍ fixed to a shaft 37, driven by a motor 38, preferably of the electric type. 39, 39′, indicate pairs of spaced lugs preferably integrally formed on the outer surface of the ring member 31 at diametrically opposite sides thereof, the ends of the lugs cooperating with caps 40 to form bearings, one bearing forming a support for a frame 41 about to be described and the other bearing forming a support for a shaft 42 carrying a weight 43, which counter balances the frame 41 and parts carried thereby. The caps 40 are held in position by suitable cap screws 44, which, when tightened, hold the frame 41 and shaft 42 at the desired positions with the weight 43 at any determined angle relative to the axis of the shuttle ring member 31. The frame 41 comprises a cross bar 45 having transverse openings formed in its opposite ends to receive the corresponding ends of shafts 46, 47, the ends of these shafts being threaded to receive nuts 49, by which they are secured in the openings and in fixed relation to the bar 45. The shafts 46, 47, are adapted to rotatably support spools 50, 51, respectively, to be later referred to. Intermediate the ends of the cross bar 45 is a boss (not shown), preferably disposed between the lugs 39. The boss is hollowed out to form a bearing for one end of a shaft 52 (see Figs. 4 and 15), carrying a guide roller 53 to which reference will later be made. 54 indicates a bracket or arm, preferably formed integrally with the bar 45, and formed with an opening to receive one end of a rod 55. The opposite end of the rod 55 carries a supporting member 56, in which is formed an opening aligned with the opening in the boss just referred to and forming the bearing for the outer end of the shaft 52. The ends of the rod 55 are screwthreaded to receive nuts 57, by means of which the rod is secured to the arm 54 and the supporting member 56 is secured to the rod. To support the supporting member in spaced relation to the arm 54, the rod 55 is reduced near its opposite ends to form shoulders, which bear against the inner faces of the arm 54 and member 56. The spool 51 is adapted to support the web of tire material which is supplied by the shuttle to and associated with the bead strands $a$ and embedding strips $b$, being unwound from the spool 51 as the shuttle rotates, such material comprising a plurality of cords $c$ arranged substantially parallel to each other, or, by preference, a plurality of parallel arranged cords $c$ embedded in sheet rubber $d$; whereas the spool 50 is adapted to have wound on it the liner material $c'$, (which is wound in with the sheet rubber $d$ and cords $c$ for well known reasons), for which purpose the inner end of the spool 50 is provided with a grooved pulley 58, so that a band or belt 59, engaging a groove 60, in the ring 5 may rotate the spool 50, as the ring member rotates, and thus cause the liner material $c'$ to wind thereon. 61, 61, indicate arms secured to the ring member 31 and provided with suitable stud shafts on which guide rollers 62 are mounted to guide the band 59 into alignment with the pulley 58 and groove 60.

63 indicates as an entirety an automatic mechanism for controlling the paying out or supply of the web of cords or web of cords and sheet rubber so that the tension on the web will be substantially uniform at all times. Of this mechanism, 64 indicates a frame swingably mounted on the rod 55 between the arm 54 and supporting member 56. The frame 64 preferably comprises a sleeve 65, having depending arms 66, connected by a rod 67, loosely supporting a roller 68 to which reference will later be made. The upper wall of the sleeve 65 is preferably thickened to provide a counterbalance to offset gravity on the frame 64 as it rotates with the shuttle frame 41. 69 indicates a brake wheel fixed to the inner end of the spool 51. 70 indicates a brake band wrapped around a portion of the wheel, one end of the brake band being fixed to a stud 71 projecting laterally from the inner side of the cross bar 45 and its opposite end being secured to the adjacent free end of the frame 64. 72 indicates a spring having one end fixed to the frame 41, preferably to a plate 73 fixed thereto by a bolt 74 and its other end connected to the frame 64 and normally tending to swing it in one direction about the rod 55. As shown in Fig. 4 the spring is disposed on that side of the frame 64 remote from the spool 51 and acts to swing the free end of the frame away therefrom, and as the brake band 70 is connected to the frame 64, such action will result in applying the brake to the wheel 69. A wound web of tire materials $c$, $d$, is placed on the spool 51, as shown in Fig. 4 and its end is led over and around the roller 68 and then over and around the guide roller 53, from which the web leads to the platen for association with the strands $a$ and strips $b$ and fabrication of the composite web A. As the web $c$, $d$, is drawn off of the spool 51, due to the revolving movement of the latter with the shuttle ring member 31, the tension of the web running around the rollers 68, 53, will tend to expand the spring 72 and hence relieve the tension of the brake band 70 on the brake wheel 69, thereby permitting the latter to rotate to pay out the web; following the relieving of the brake band and the paying out of the web under the tension imparted thereby to the swinging frame 64, the tension of the web on the latter will be decreased, the effect of which will be to permit the spring 72 to act on the frame 64 and thru it on the brake band 70 to wrap it about the brake wheel 69 and thereby stop the free rotation of the latter and undue paying out of the web. It will be understood that the parts just referred to are arranged to coact so that the braking and releasing of the brake wheel incident to the increase and decrease of the tension of the web running around the roller 68 will result in controlling the rotation of the spool 51 to the end that the paying out of the web therefrom and the tension thereon at all times is substantially uniform. As a result of this arrangement and operation, the web is delivered to the platen uniformly and wound thereon and around the spaced bead strands $a$ and strips $b$ smoothly as the materials become associated.

75 indicates a column disposed at that end of the base 1 remote from the standard 3 and flanged around its lower end to facilitate its assembly on the base by screws or bolts 76. The column 75 and a rear extending arm 77 preferably comprise a hollow casting. The outer portion of the arm is shaped to form a housing 77$^a$ for a friction clutch mechanism, indicated as an entirety at 78 and bearings 79 for the driven shaft 80 to which the chuck 81, for the core 2, is connected. The housing 77ª is formed with an opening 77ᵇ, closed by a suitable cover 77ᶜ, 82 indicates as an entirety an automatic throw-out and stopping mechanism for stopping the motor 83, which drives the driven element 78ª of the friction clutch mechanism 78, and the motor 38 for driving the shuttle and other elements to be hereinafter referred to.

Referring to the friction clutch mechanism 78, the driven element 78ª thereof preferably comprises a sprocket wheel loosely fitting the chuck shaft 80 and capable of freely rotating and sliding endwise thereon. The hub portion 84 of the wheel 78ª is extended to either side and preferably provided with conical side walls 84ª to constitute clutch members with which similarly shaped clutch elements 85, 86, engage. The side walls 84ª may be covered with suitable material to increase the friction between the wheel 78ª and clutch elements 85, 86. The hub 86ª of the clutch element 86 is preferably splined to the shaft 80 in any desired manner. 87 indicates an antifriction thrust bearing surrounding the shaft 80 and interposed between the end of the hub 86ª and the end wall of the housing 77ª and adapted to take the thrust transmitted by the shaft 80 through the clutch elements due to the pressure exerted between them when operating to transmit the power of the wheel 78ª to the shaft 80. The hub 85ª of the clutch element 85 is splined to the shaft 80 in any desired manner so as to slide endwise thereon to effect friction engagement between the clutch members in the manner about to be described. 88 indicates an opening formed in the shaft 80. The opening 88 extends longitudinally of the shaft 80 and diametrically thereof. 89 indicates a plate or key slidably fitting the opening 88 and movable endwise therein. As shown in Fig. 5, the inner edge of the plate 89 engages the end of the hub 85ª to move the latter toward the right, as viewed in this figure, when operated by a thrust means indicated as an entirety at 90. When so operated, the clutch element 85 is pressed against the adjacent side wall 84ª, which pressure in turn will slide the wheel 78ª toward the right to effect frictional engagement between the other side wall 84ª and the clutch element 86. As the latter element abuts the thrust bearing 87, the pressure set up by the movement of the plate endwise of the shaft 80 will effect frictional engagement between the clutch members to a greater or less extent and thereby effect a drive between the wheel 78ª and shaft 80 with a greater or lesser amount of slip, dependent upon the pressure applied by the plate 89. Of the thrust means 90, 91 indicates a rod slidably fitting an opening 91' leading inwardly from the outer end of the shaft 80 (the left end thereof as viewed in Fig. 5) and extending at its inner end into an opening 92 formed in the outer edge of the plate 89, such arrangement serving as an interlock to hold the plate 89 against movement laterally in the opening. 93 indicates a lever pivoted at one end in any desired manner upon a suitable knuckle 94 provided on the housing 77ª or bearing portion 79. The opposite end of the lever 93 is connected by a link 95 with a foot lever 96. 97 indicates a plunger carried by the lever 93 and positioned to engage the outer end of the rod 91. The parts just described are so correlated that when the foot lever 96 is pushed downwardly, the lever 93 will be moved toward the housing 77ª and thru the plunger 97 will move the rod 91 endwise inwardly to slide the plate 89 in the opening 88 endwise and axially of the shaft 80 to cause frictional engagement of the friction clutch members, as already described. The plunger 97 is preferably adjustably fixed to the lever 93 to take up wear between the friction clutch members. For this purpose, the plunger 97 is screw-threaded into an opening formed in the lever 93 and projects beyond the outer face of lever 93 to receive a nut 98 to lock the plunger in its adjusted position. By loosening the nut 98 and rotating the plunger in one direction or the other its inner end can be properly positioned to effect the desired frictional engagement between the friction clutch members. By controlling the downward movement of the foot lever 96, the frictional engagement between the clutch members, and likewise the speed of the shaft 80 relative to the sprocket wheel 78ª, can be regulated, as desired to cause winding of the bead structures of the web A on the core 2 under any desired tension and stretching of the body portion of the web; or by adjusting the foot lever 96 during the winding operation, the tension on the web and stretch of these parts for each convolution on the core may be increased or decreased at the will of the operator. Accordingly, it will be seen in operating the apparatus, that for each convolution of the web A wound on the core, the friction between the clutch members may be increased so that the succeeding convolutions will be wound under successively increasing tension. The throw of the lever 93 can also be changed by adjusting the ends of the link 95 so that the pivots therefor engage the openings 95ª, 96ª, formed in the lever 93 and foot lever 96 respectively.

99 indicates as an entirety means for locking the foot lever in different operating positions, to hold the lever 93 and parts associated therewith in the desired position or in the successive positions to which they are operated. Of these means, 100 indicates a plate fixed to the base 1, preferably by screws 101 and provided with a plurality of ratchet teeth 102. 103 indicates a pawl acted upon by a spring 104 to normally hold the pawl 103 in operative relation to the teeth 102. The tail 105 of the pawl 103 extends rearwardly into position to be engaged by an arm 106, fixed to a foot plate 107 pivoted on the lever 96.

The foot plate 107 is engaged to push the foot lever downwardly the desired distance. When so operated, the pawl 103 engages a tooth 102 to lock the lever against upward movement. After one or more revolutions of the core 2, this operation may be repeated, moving the pawl to the next tooth 102. This operation may be repeated until all of the teeth are engaged, or the lever may be moved to its extreme lower position or to any intermediate position and maintained therein throughout the operation of winding each tire casing. To release the pawl, the foot plate 107 is rocked about its pivot in a counter-clockwise direction, which movement rocks the pawl 103 and releases it from the tooth 102, whereupon the lever will swing upwardly and release the clutch members, a spring 108 being provided and acting on the lever 96 to effect this movement.

The power means for driving the driven wheel 78$^a$ preferably comprises the following: the motor 83, already referred to, fixed to the base 1 and connected by a flexible coupling 108$^b$ to a shaft 108$^c$. The shaft 108$^c$ is mounted in suitable bearings provided in the front and rear walls of the column 75. 108$^d$ indicates a worm on the shaft 108$^c$ which drives a gear train 108$^e$, which in turn drives a sprocket 108$^f$. 108$^g$ indicates a chain running around the sprocket 108$^f$ and the sprocket 78$^a$ to rotate the latter.

109 indicates as an entirety a mechanism for consolidating the materials $a, b, c, d$, into final fabricated form or condition, thereby ironing out and compressing the helically arranged layers of the materials $c, d$, and the folded over portions of the strips $b$ to embed the bead strands $a$ therein, to provide the composite web A, having bead structures along its opposite edges, ready for winding on the core or drum 2. Of the consolidating mechanism 109, 110 indicates a frame comprising an arm 111 having upright sections 112. The upper ends of the column 75 and frame sections 112 are provided with hollow lugs 113, in which are mounted the opposite ends of a connecting bar 114, connected to the lugs 113 by nuts 115. The frame sections 112 are shaped to provide suitable aligned bearings for a plurality of rolls 116, 117, 118, and 119. As shown particularly in Fig. 7, the associated materials pass first around the roll 116, then around the roll 117, then around the roll 118 and finally around the roll 119, from which the web A leads to the member 2.

120 indicates aligned supplemental frames extending laterally from the frames 112 and fashioned to form (1) ways 112$^a$ for a pair of bearing boxes 121 in which is mounted a roller 122 and (2) ways 112$^b$ for a preliminary compressing mechanism, indicated as an entirety at 123, which will later be described. As shown in Figs. 1 and 7, the roller 122 is mounted to move in a plane that is at right angles to a line cutting the axes of the rolls 117, 119, and midway between them so that the roller 122 will simultaneously engage the rolls 117, 119. The ends of the frames 120 are formed with screw threaded openings for screws 124 carrying hand wheels 125 by means of which they may be rotated to adjust the inner ends of the screws against compression springs 126, the springs 126 bearing against the bearing boxes 121 so that the roller 122 will bear with the desired pressure against the rolls 117 and 119, or the web A as it passes between the rolls 117, 119, and roller 122, so that the latter may compress the tire materials with any desired pressure depending upon the adjustment of the screws 124 to consolidate the associated materials into a unitary, composite web A. In the arrangement just described, I provide but one pressure roller but cause it to co-operate against two rolls so that the material is subject to two compressing or consolidating operations.

Certain or all of the rolls 116, 117, 118, 119, may be positively driven. In the form of construction shown I have provided a driving means for all of these rolls, such means consisting of the following elements: 127 indicates a gear which is driven by a power mechanism 127′ to be later described. The gear 127 is mounted on a shaft 127$^a$ carrying a pinion 127$^{a'}$ which meshes with pinions 127$^b$, 127$^c$, fixed to the shafts constituting extensions of the shafts for the rolls 117, 119. Between the web engaging roller 117 and the adjacent side of the column 75, the shaft for the roller 117 carries a gear 117$^a$ which meshes with similarly arranged gears 116$^a$, 118$^a$ fixed to the shafts for the rollers 116, 118, respectively. As the gears just referred to are of the same size and the pinions 127$^{a'}$, 127$^b$ and 127$^c$ are also of the same size, it will be seen that the rolls 116, 117, 118, 119, will be driven at the same rate of speed.

The preliminary compressing mechanism 123 is preferably arranged between the first roll 116 and the free end of the platen 8. In the arrangement shown for illustrative purposes, the mechanism 123 is positioned relatively close to the free end of the platen 8 so that it may function immediately after the materials $a, b, c, d$, leave the platen to prevent their distortion or relative movement between them or portions of such materials, and particularly to prevent any such movement due to the turning of the materials around any one or more of the rolls 116, 117, 118, 119. The preliminary compressing mechanism preferably comprises an idle roll 128, which is mounted in stationary bearings 128$^a$, and an idle roll 129, which is mounted in a pair of bearings 130 slidably fitting a pair of supports 131 and pressed upwardly or toward the roll 128 by springs 132. The supports 131 are shaped at their lower ends to provide shoes which slidably fit the upper ways 112$^b$, whereby the rolls 128, 129, can be adjusted into any desired position relative to the free end of the platen 8. Each of the rolls 128, 129, is preferably formed of soft rubber and the central portion thereof between those portions engaged by the bead structures of the web is covered with one or more turns of muslin or other suitable material to make such central portion somewhat softer than the end portions engaged by the bead structures, as well as to prevent sticking of the web to the rolls. The supports 131 are adjustably fixed to the frames 120 by suitable set screws.

Of the power mechanism 127′, 133 indicates a gear mounted on a stud shaft carried by one inner wall of the column 75 and meshing with the gear 127. 134 indicates a pinion fixed to a shaft 135 also carried by the walls of the column 75 and meshing with the gear 133. The shaft 135 carries a bevel gear which is driven by a bevel pinion 136. The pinion is fixed to a shaft 137 carrying a sprocket 138, which in turn is engaged by a chain 139. The chain 139 in turn engages a sprocket 140 on one end of a countershaft 141. The shaft 141 is mounted in the frame base 1 and carries at its opposite end a sprocket 141′. 142 indicates a chain running around the last mentioned sprocket and a sprocket 143 fixed to the shaft 36$^c$. From the foregoing description it will be seen that the driving of the consolidating rolls and rotation of the shuttle is effected from the motor 38, this arrangement providing for a simultaneous starting and stopping of these driven elements so that all portions of the materials will be acted on when the machine is started in operation and their feeding stopped when the power is shut off.

144 indicates a guide means for the web A for supporting it at points beyond the consolidating mechanism 109 and for guiding it onto the periphery of the core 2. The guide means 144 preferably comprise one or more arms 145 pivoted on lugs 146 formed integrally with the arm 111, a shoe 147 carried by the outer ends of the arms 145 and a roller disposed rearward of the shoe and supported at its opposite ends by the arms 145. The shoe may consist of a plurality of parallel bars carrying pairs of bearings for rollers, and over which the web A runs, to reduce the friction thereon.

The shoe frame and the rollers thereon are so arranged that the web will be guided to the drum in a substantially tangential direction. As the web guide means and its construction will form the subject matter of a separate application, further description thereof will not be necessary.

In the operation of the machine, the materials are supplied from the spools 10, arbors 25 and spool 51, the latter revolving as already described, and serving (1) to wrap or wind the cords $c$, or cords $c$ and sheet material $d$ helically about the spaced strands $a$, and (2) to fold the over-lying portions of the strips $b$, as the latter move beyond the free ends of the guides 27, 28, around or over the strands $a$ to embed them therein. This operation is partly shown in Fig. 2$^b$ at the left side of the platen 8. Due to the feeding of the strands $a$ and strips $b$ longitudinally of the platen and the rotation of the shuttle, the materials are properly associated before being delivered to the consolidating mechanism. This latter mechanism, as already described, then operates to compress or consolidate the material under pressure into a fixed relation, thereby producing a single, composite web A having beads along its opposite edges, from which the casings or carcasses are made.

151 indicates a mechanism having elements 151$^a$ which engage the bead structures at opposite sides of the web A to compress the same into position at opposite sides of the core 2, in side by side or helical relation. The elements 151$^a$ comprise suitably shaped rollers mounted on the outer ends of plungers. The inner ends of the plungers are connected to pistons mounted in cylinders 151$^b$ to which compressed air or other fluid is admitted to actuate the pistons toward the core 2. The cylinders 151$^b$ are mounted in or formed integrally with a frame 152 carried on the outer end of a swingable arm 153 fixed to a shaft 154. The shaft 154 is mounted in a suitable bearing provided in the rear wall of the standard 75. As this mechanism will form the subject matter of a separate application, further description herein will not be necessary.

155 indicates as an entirety the mechanism for rolling down the body portion of the web, whereby the first convolution of the web will be rolled down and into close engagement with all portions of the core and each succeeding convolution with the previous convolution.

Of this mechanism 156 indicates a frame mounted in suitable guides 157 arranged to permit movement of the frame 156 radially of the core 2. The guides 157 are preferably supported on the side wall of the column 75 (see Fig. 1). 158 indicates an arm pivoted at 158$^a$ to the base 1 and to the frame 156. 159 indicates a cylinder, preferably trunnioned at 159$^a$ on a bracket 159$^b$, which may also be supported on the column 75. 159$^c$ indicates a piston rod connected to the piston within the cylinder 159 and to the arm 158. By admission of compressed air or other fluid to one side of the piston or the other, the frame 156 may be operated out of engagement with the web or into engagement therewith and caused to exert any desired pressure to roll down the convolutions of the web as the winding operation takes place. The rolling down devices comprise rollers mounted on the outer ends of plungers each carrying a piston which operates in a cylinder (two such cylinders being shown at 115') to which compressed air is admitted to force the piston outwardly. The rolling down mechanism 155 will form the subject matter of a separate application, for which reason further description herein will not be necessary.

As illustrative of the automatic stopping mechanism, I have shown two forms of construction, namely, one (see Figs. 9, 10, and 11) wherein a motor—for example the shuttle driving motor 38—is stopped at a predetermined position; and another (see Fig. 12) wherein both motors 38 and 83 and other driven elements are stopped. As the motor 38 drives the shuttle and consolidating rolls, 16, 17, 18, 19, it will be seen that in the first form of construction the feed or supply of the web to the core is stopped, whereas the core supporting shaft and its driving motor 83 continues in operation without any possible damage due to slippage between the friction clutch elements, already referred to.

It will be understood that the automatic stopping means 82, of the form shown in Figs. 9, 10, and 11 may be applied to stop the core operating shaft if desired; also that either form of stopping means 82 may be applied to or associated with various machines and apparatus, so that it is not limited in its useful application (as shown herein) to a tire carcass making machine, for which reasons certain of the claims herein comprehend a construction wherein any driven member of its driving means may be stopped after such member has revolved a certain angular distance or made any predetermined number of revolutions.

Referring to Figs. 9, 10, and 11, 160 indicates a worm fixed to the core shaft 80 and meshing with a worm wheel 161. The worm wheel 161 is keyed to a shaft 162. The shaft 162 is mounted in a bearing provided in a wall 163, which forms an integral part of of the standard 75, such wall being shaped to enclose the worm 160 and worm wheel 161 at one end of the shaft 162 and at the other end of the shaft to provide a cup member 164, which cooperates with a cap 165 to form a casing for certain elements about to be described. The worm 161 engages the end wall of the bearing to prevent endwise movement of the shaft 162 in one direction; the remote end of the shaft is provided with a head 162ª, which acts through the elements to be referred to (see Fig. 9) to prevent endwise movement of the shaft in the opposite direction. The engaging edges of the cup member 164 and cap 165 are shaped (for example, rabbeted) to form a rotatable seat for the cap, whereby the latter may be rotated on or relative to the cup member to permit adjustment of a contact 166 carried by the cap, for a reason which will later appear. The cap is held in any position of adjustment by one or more set screws 165ª.

167 indicates a collar fixed to the shaft 162 and operating as an armature for an electromagnet 168 having a hollow core 168ª rotatably mounted on the shaft 162. The collar is provided with a flange 167ª which is engaged by the magnet 168 when the latter is energized. The base portion of the cup member 164 is formed with an annular recess 164ª surrounding the bearing for the shaft 162 to receive the free end of the collar 167 and through the engagement thereof with the bottom wall of the recess 164ª to prevent the endwise movement of the shaft above referred to. The electro-magnet 168 comprises the core 168ª (already referred to) having a flange 168ᵇ at its outer end, a coil 169, a shell 170 and an annular plate 171 at its inner end fitted to the free end of the core 168ª. The plate 171 is provided with an arm 171ª which is held against a stop 172 by a spring 173 and moves with the armature into engagement with the contact 166 to close a supplemental electric circuit 166', the effect of which is to stop the motor 38. The spring 173 is preferably a helix, being connected at its outer end to the cup member 164 by means of a bracket 174, the foot of which is fixed to said member by a bolt 175 insulated from the latter so that the bolt may serve as a terminal for the circuit or circuits. The inner end of the spring is fixed to the shell in any desired manner, but is insulated therefrom, as shown in Figs. 9 and 10. One lead from the coil 169 is connected to the inner end of the spring 173; the other lead from the coil is grounded as shown at 176—Fig. 9. 177 indicates a transformer, the secondary coil of which is connected by a lead 178 with the cap 165 and by a lead 179 with the terminal 175, so that when current is supplied to the primary coil of the transformer 177, current will flow through the leads 178, 179, and hence energize the coil 169, and as a result thereof the magnet and armature will be attracted to effect a driving connection between them, whereby the magnet will be rotated with the armature and the arm 171ª carried around until it engages the contact 166. The contact 166 preferably comprises a resilient plate carried by a bracket 166ª. The bracket is fixed to but insulated from the cap 165 by a bolt 166ᵇ, which forms a terminal for a lead 180 connected to the coil of a relay 181, the opposite end of the coil being connected by a lead 182 to the lead 179 and completing the supplemental circuit 166'. The motor 38 is shown as a single phase alternating current motor, connected by leads 183, 183ª, with the wires 184, 184ª, controlled by a suitable switch 185. The lead 183 has interposed in it a pair of contacts 186 normally closed by a contact bar 186' connected to the armature of the relay 181. The wires 184, 184ª, are connected to the primary coil of the transformer 177. The operation of the mechanism just described is as follows: in normal or starting position the arm 171ª is arrested by the stop 172. The motor—motor 83—for driving the shaft 80 is first started, which drives the worm gear 160, worm 161, shaft 162 and collar 167, the gear and worm shown having a ratio of 24 to 1; then the switch 185 is closed, this operation starting the motor 38 and supplying current to the primary of the transformer 177, whereby current will flow through and energize the coil 169, which in turn will effect magnetic connection between the collar or armature 167 and the electro-magnet to rotate the latter. As this rotation continues the arm 171ª will move around into engagement with the contact 166 and complete the circuit through the supplemental circuit 166'. As the coil of the relay 181 is connected in series in the supplemental circuit, it will be energized and thus effect operation of the contact bar 186' to break the circuit through the lead 183 to the motor 38. Fig. 10 shows the contact 166 in position to be engaged by the arm 171ª when the shaft 80 has made three revolutions following the closing of the circuit to the motor 38 and energizing of the electro-magnet coil 169, that is three convolutions or six plies of tire material having been wound on the core. By rotating the cap 165 on the cup member 164, the contact can be adjusted to various positions, as shown in dotted lines in Fig. 11, to effect a closing of the supplemental circuit 166' when the shaft 80 has made a greater or lesser number of revolutions.

Fig. 12, in addition to showing the circuits and devices for automatically stopping both motors 38 and 83, also show the use of magnetically operating switches and push button controls for operating these switches to start the motors and simultaneously stop them. In this form of construction I preferably use three-phase alternating current motors 38', 83', which respectively drive the shuttle and core shaft. 187 indicates the leading in wires having branch wires 187ª for the motor 38' and branch wires 187ᵇ for the motor 83'. 188 indicates a magnetically operating switch for the motor circuit 187ª, being normally open, but closed by the energizing of the coil 188ª. 190 indicates a magnetically operating switch for the motor circuit 187ᵇ, being normally open, but closed by the energizing of the coil 190ª to connect the cantacts 191, 191ª. 192 indicates a push-button which is normally open, for closing the circuit to the switch 190 for the motor 83'. This circuit is traced as follows: lead 193 connected to a branch wire 187ᵇ, contact 193ª, push button 194 (which is normally closed and is operated to open the circuit to both motors as will later appear), contact 193ᵇ, leads 195, 195ª, contact 196, push button 192, contact 196ª, lead 197, coil 190ª, leads 198, 198ª, contact 199, contact bar 199ˣ attached to armature of relay 181', contact 199ª and lead 200 connected to a leading in wire 187. From the foregoing description it will be seen that when the push 192 is operated the magnetic switch 190ª will effect the closing of the switches for the branch wires 187ᵇ. To maintain the switches closed, I provide a circuit as follows: lead 193, contact 193ª, push-button 194, contact 193ᵇ, lead 195, lead 201, lead 201ª, contact 202, contact finger 202' attached to armature of electro-magnet 190, contact 202ª, lead 203, coil 190ª, leads 198, 198ª, contact 199, contact bar 199ˣ, contact 199ª and lead 200.

204 indicates a push-button, which is normally open, for closing the switch 188 to complete the circuit to the motor 38'. This circuit is traced as follows: lead 193, contact 193ª, push-button 194, contact 193ᵇ, lead 195, leads 201, 201ª, contact 202, contact finger 202', contact 202ª, lead 203, lead 197, lead 205, contact 206, push-button 204, contact 206ª, lead 207, contact 208, coil 188ª, lead 209, lead 198ª, contact 199, contact bar 199ˣ, contact 199ª and lead 200. Upon the energizing of the coil 188ª and operation of the switch 188 the contact finger 188ᵇ attached to armature of the magnet bridges the contacts 208, 208ª, to close a circuit for maintaining the coil 188ª energized and the switch closed. This circuit is traced as follows: lead 193, contact 193ª, push-button 194, contact 193ᵇ, leads 195, 201, lead 210, contact 208ª, contact finger 188ᵇ, contact 208, coil 188ª, leads 209, 198ª, contact 199, contact bar 199ˣ, contact 199ª, and lead 200.

To stop the machine, all that is necessary is to operate the push-button 194, which will open the circuit between the contacts 193ª, 193ᵇ. As this push-button is interposed in the leads (193, 195) which form the circuits for the coils of both magnetic switches 190, 188 which in turn control the circuits to both motors 38', 83', it will be understood that its operation will stop both motors and hence effect a stoppage of the entire machine.

From the foregoing description it will be seen that the coils for the magnetic switches 188, 190, and the circuit for maintaining the switch 190 closed are so related and connected, that the circuit to the motor 83' must be closed before the circuit for the motor 38' can be closed. Accordingly, in the construction and arrangement shown the motor 38' for operating the shuttle and consolidating rolls cannot be operated unless the chuck motor is first set in motion to drive the core supporting shaft 80. This prevents the fabrication of the web A and the feeding thereof unless the core is being driven to wind the web thereon.

The electro-magnet loosely mounted on the shaft 162 is shown at 168 and the transformer at 177', the primary coil of the latter being connected to the branch leading in wires 187ᵃ in the usual manner, whereby current is supplied to the transformer upon the closing of the switch 188 for the motor 38' and the transformer in turn energizes the coil of the magnet 168 to effect its connection to the shaft 162. The contact arm carried by the magnet 168 is shown at 171 and engages the contact 166 to close the circuit through the coil of the relay 181' comprising lead 211, relay coil, lead 212, secondary coil of transformer and lead 213 to ground; which operation will effect operation of the relay 181' and open the circuit between the contacts 199, 199ᵃ. As the contacts 199, 199ᵃ, are included in the circuits of the magnetic switches for both motors 38', 83', it will be seen that when the arm 171 is rotated into engagement with the contact 166, the entire machine will be automatically stopped.

214, 215, 216, 217 indicate limit switches each operating as follows; switch 214 controls the closing of a circuit through the secondary of the transformer 171, and relay 181' in the event the liner fails to wind properly on its winding roll; for instance, causes a backward rotation of its roll due to its sticking to the cords and rubber; switch 215 controls the closing of the circuit in the event the supply of the cord material gives out; switch 216 controls the closing of the same circuit in the event the supply of one of the flipper strips gives out; and switch 217 controls the closing of the circuit in the event the supply of the other flipper strip gives out. As shown in Fig. 12, each switch is connected by separate leads 218, 219 with the ground and with the lead 211, so that in the event any one of the switches closes, the circuit thereby completed, which circuit includes the lead 211, coil of relay 181', lead 212, transformer secondary, will effect the energizing of the relay coil; as a result, the relay will break the circuit through the contacts 199, 199ᵃ, and thereby stop the complete machine.

The limit switch 214 is shown in Figs. 13 and 14. This switch comprises the following parts: 220 indicates a strip formed from resilient metal into a circular section 220ᵃ, which fits and frictionally engages the hub of the liner roll 50, and a U shaped arm 220ᵇ, which straddles a contact 221 mounted on, but insulated from, a bolt 222 which is supported in the frame member 45; one leg 222' of the arm 220ᵇ constituting the lead 218 which is grounded through the machine and the other leg 223 constituting the switch element arranged to engage the contact 221, to which is connected the lead 219. 224 indicates a section of insulating material mounted on the leg 222 and positioned to prevent contact between the leg and the contact 221. In operation, the liner $c'$ is wound on the roll 50, which is rotated counter-clockwise as shown in Figs. 4 and 13, such rotation tending to rotate the strip 220, but due to the engagement of the leg 222' with the contact 221 as this rotation takes place, the latter will hold the arm 220ᵇ stationary (while the hub continues to rotate) with the leg 223 spaced from the contact 221, as shown in Fig. 13. If, however, the liner sticks to the cords $c$ and rubber $d$, as the latter feeds through its guide rolls, the liner will cause a slight backward rotation of its roll, which in turn will move the arm 220ᵇ in the opposite direction far enough to effect engagement between the leg 223 and contact 221, thereby completing the circuit through the relay coil 181' and effecting an opening of the circuit through or across the contacts 199, 199ᵃ, and stoppage of the entire machine.

The limit switch 215 is shown in Fig. 15. This switch comprises a spring arm 225 connected to a rod 225' which constitutes or has connected to it the lead 219. The rod 225' is supported at its opposite ends by a pair of lugs 225ᵃ (one being shown in Fig. 15) carried by the bar 45 and member 56, the arm 225 being disposed midway between the ends of the rod 225' and in position to normally engage with the roller 53. As shown, the arm 225 is held out of such engagement by the cords and rubber, as the latter run over the roll. The roll 53 constitutes the lead 218 which is grounded through the machine. In operation, if the supply of cords give out, the arm 225 will engage the roll 53 and thereby close the circuit through the coil 181' and stop the machine, as already described.

As already set forth, a limit switch is provided for each flipper strip $b$, so that in the event the supply of either gives out, the machine will be stopped. One of these switches is illustrated in Figs. 16 and 17 and comprises the following parts: 226 indicates a drum fixed to the arbor 24. 226' indicates a strip formed from resilient metal into a circular section 227, which fits and frictionally engages a grooved portion in the drum, and a U-shaped arm 228 which straddles a contact 299, mounted on a screw 230. By preference the screw 230 is mounted in an opening 231—but insulated from the walls thereof as shown in Fig. 16—formed in an arm 232 carried by a collar 232' which is secured to the shaft 23 by a set screw 233. One leg 228ᵃ of the arm 228 constitutes the switch element which is grounded through the machine; the other leg 228' engages the contact to prevent rotation of the strip 226' on the drum 226. The screw 230 is connected to a wire which constitutes the lead 219. 234 indicates a section of insulating material mounted on the leg 228' and positioned to prevent contact between it and the contact 229.

In operation the arbor 24 rotates counterclockwise, as viewed in Fig. 17, such rotation tending to rotate the strip 226', but due to the engagement of the leg 228' with the contact 229, as long as this rotation takes place, the latter will hold the arm 228 stationary (while the drum continues to rotate) with the leg 228ª spaced from the contact as shown in Fig. 17 and the leg 228' under slight tension. If the flipper strip *b* gives out, the tension of the arm 228', under which it has been placed due to the rotative effort imparted to it by the drum 24, will cause a backward rotation of the drum far enough to effect engagement of the leg 228ª with the contact 229, thereby closing the circuit through coil 181' and opening of the motor circuits, as already described.

I prefer to construct each of the switches 214, 215, so that two pairs of contacts must be closed to complete the circuit through the coil 181', the purpose being to effect stoppage of the machine at a predetermined point to bring the shuttle to a position where the end of the web and the end of the next spool of material can be readily connected or spliced together. To carry out this construction, I include in the circuit—for example, in the lead 219 a pair of contacts, one, indicated at 235 (see Fig. 1), projecting rearwardly from the shuttle ring member 31 but insulated therefrom and the other, indicated at 236, mounted on and positioned in the path of movement of the contact 235. The contacts 235, 236, make contact each time the shuttle completes a revolution, but as the switch elements 223, 225, are held out of contact with the contact 221 (Fig. 13) and the roll 53 (see Fig. 15), the circuit cannot be completed. However, should the liner rotate in a rearward direction and effect engagement of the arm 223 with contact 221, or in the event the supply of material ceases, the arm 225 will engage the roll 53 and thereafter, as the ring member rotates, the engagement of the contact 235 with the contact 236 will complete the circuit. By positioning the contact 235 at a predetermined position angularly of the shuttle ring member 31, it will be seen that the shuttle will be stopped at a predetermined position, this arrangement preferably being such that the frame carrying the spools 50, 51, will be at one side with the web extending substantially horizontally. The inner end of the web of cords and rubber is connected to the spool by a pair of spaced strips or leaders (not shown) which maintain such end suspended from the spool following the operation of the switch arm 223 or 225 until the contacts 235, 236, complete the circuit, as described, to effect opening of the motor circuits.

The composite web A is delivered to the winding member 2 to be convolutely wound thereon. The member 2 chosen for illustration comprises a carcass shaping core on which the carcass is made ready for the finishing operation or operations. The core 2 comprises a center member of the desired shape in cross section and bead rings, one of which is shown in Fig. 1, preferably having circumferential surfaces extending substantially at right angles to the plane of the center member or parallel to the axis of the core and providing walls on which the bead portions of the web are wound in side by side or helical relation. The rings are removably clamped in position by suitable devices 237 having handles 238. The center member is shaped to engage the chuck 81 and the latter is constructed to clamp the center member in the position shown. 239 indicate devices (only one being shown) for securing the end of the web to the core in the starting of the winding operation thereon.

The push buttons 192, 194, and 204 may be mounted at any desired place on the machine, but preferably they are provided in a casing 240 which is supported on the outer frame section 112 (see Fig. 1).

241 indicates a handle which operates the valve, or valves for controlling the flow of the fluid to the cylinders for the sets of rolling down devices and movement of the set which engages the body portion of the web toward and from the core 2. The valve mechanism may be of any desired construction, or more than one valve mechanism and handle may be provided.

242 indicates a casing, one wall of which forms a cover, for enclosing the magnetic switches, magnets and relay and other elements for controlling the electric circuits. The construction of these elements may be of any desired form and they may be arranged and connected in any approved manner.

Where I provide two pairs of contacts for stopping the motors with the shuttle in a predetermined position, upon the sticking of the liner to the web or giving out of the rubber material, as above described, I connect the leads 218 from the switches 214 and 215 to the contact 235 so that following the engagement of either pair of contacts 221, 223, or 225, 53, the circuit will be completed through the contacts 235, 236. In this arrangement, the contact 236 is grounded, as shown at 218' in Fig. 12. The arrangement just described eliminates complicated wiring to the contact elements 223, 221.

To those skilled in the art to which my invention relates many changes in construction and widely differing embodiments and applications of my invention will suggest themselves without departing from the spirit and scope thereof. My disclosures and the description herein are purely illustrative and

What I claim is:

1. In apparatus of the class described, the combination with a support, of a guide, a shuttle, means for supplying materials to said guide, material supply means on said shuttle, means for rotating said shuttle, whereby the material thereon is wound around the materials supplied to said guide, means for consolidating said materials, an electric motor for operating said shuttle and said supply means, a pair of contacts one carried by said support and the other carried by said shuttle and arranged to engage each other each time the shuttle rotates, electrically operated means for stopping said motor, said means including a pair of contacts one of which is operated by a driven member of the apparatus, and an electric circuit in which said pairs of contacts are included, whereby the contacts of both pairs thereof must be engaged to stop the motor.

2. In apparatus of the class described, the combination with a support, of a platen mounted thereon, a pair of spaced guides on said platen, each having bottom and side walls associated with said platen, one side wall of each guide being adjustable laterally, means for feeding said materials in line with said guides, a shuttle having material supply means, means for rotating the shuttle about said platen, whereby the material is wound around said spaced materials as they feed forwardly, and means for consolidating said materials into a web.

3. In apparatus of the class described, the combination with a support, of a platen mounted thereon, a pair of spaced guides on said platen, each having bottom and side walls associated with said platen, one side wall of each guide being adjustable laterally, means for feeding said materials in line with said guides, said guides being arranged to deliver the materials in overlapping relation to the upper and lower faces of said platen, a shuttle having material supply means, means for rotating the shuttle about said platen, whereby the material is wound around said spaced materials as they feed forwardly, and means for consolidating said materials into a web.

4. In apparatus of the class described, the combination of a platen, means for supplying to said platen a plurality of materials in a predetermined relation for association, a series of rolls around which the associated materials run, a separate roll disposed midway between the axes of two of said rolls and mounted to move in a direction at right angles to the plane of said axes, and means for moving said separate rolls toward said two rolls to compress the material thereagainst.

5. In apparatus of the class described, the combination with a platen, of means for supplying to said platen a plurality of materials in a predetermined relation for association, a series of rolls around which the associate materials run, all of the rolls of said series being driven, a separate roll disposed midway between the axes of two of said rolls and mounted to move in a direction at right angles to the plane of said axes, and means for moving said separate roll toward said two rolls to compress the material thereagainst.

6. In apparatus of the class described, the combination with a platen, of means for supplying to said platen a plurality of materials in a predetermined relation for association, a series of rolls around which the associated materials run, a separate roll disposed midway between the axes of two of said rolls and mounted to move in a direction at right angles to the plane of said axes, means for moving said separate roll toward said two rolls to compress the material thereagainst, and means between the free end of said platen and said series of rolls for smoothing the materials as they feed thereto.

7. An apparatus as claimed in claim 6 in which the smoothing means are adjustable relative to said platen.

8. In apparatus of the class described, the combination of a support, a platen thereon, means for supplying to said platen spaced materials, a shuttle mounted to rotate on said support around said platen, a pair of shafts on said shuttle adapted to carry a pair of spools, respectively, one spool being adapted to have wound on it a liner and the other spool provided with a ribbon of material and the liner which unwind therefrom, means for rotating said shuttle, whereby the ribbon of material is helically wound around the platen and the spaced materials supplied thereto, and means engaging the spool for the liner and said support for rotating said spool as the shuttle rotates, and means arranged beyond the free end of the platen for consolidating the materials into a web.

9. In apparatus of the class described, the combination of a support, a platen thereon, means for supplying to said platen spaced materials, a shuttle mounted to rotate on said support around said platen, a pair of shafts on said shuttle adapted to carry a pair of spools, respectively, one spool being adapted to have wound on it a liner and the other spool provided with a ribbon of material and the liner which unwind therefrom, means for rotating said shuttle, whereby the ribbon of material is helically wound around the platen and the spaced materials supplied thereto, and means engaging the spool for the liner and said support for rotating said spool as the shuttle rotates, means automatically controlling the unwinding of ribbon material from its supply spool, and means arranged beyond the free end of the platen for consolidating the materials into a web.

10. In apparatus of the class described, the combination of a support, a platen thereon, means for supplying to said platen spaced materials, a shuttle mounted to rotate on said support around said platen, a pair of shafts on said shuttle adapted to carry a pair of spools, respectively, one spool being adapted to have wound on it a liner and the other spool provided with a ribbon of material and the liner which unwind therefrom, means for rotating said shuttle, whereby the ribbon of material is helically wound around the platen and the spaced materials supplied thereto, and means engaging the spool for the liner and said support, for rotating said spool as the shuttle rotates, means automatically controlling the unwinding of ribbon material from its supply spool, said means including a spring acting member operated upon by the ribbon material as it unwinds, whereby the tension of the material acts in opposition to said spring, and means arranged beyond the free end of the platen for consolidating the materials into a web.

11. In apparatus of the class described, the combination of a support, a platen thereon, means for supplying to said platen spaced materials, a shuttle mounted to rotate on said support around said platen, a pair of shafts on said shuttle adapted to carry a pair of spools, respectively, one spool being adapted to have wound on it a liner and the other spool provided with a ribbon of material and the liner which unwind therefrom, means for rotating said shuttle, whereby the ribbon of material is helically wound around the platen and the spaced materials supplied thereto, means engaging the spool for the liner and said support for rotating said spool as the shuttle rotates, a movable guide roller on said shuttle over which the ribbon of material runs as it is delivered to said platen, a brake connected to said guide roller and acting on the hub of the spool for the ribbon material, and a spring acting through said guide roller to apply the brake to the spool hub in opposition to the tension of the material running over said guide roller, and means for consolidating said materials.

12. In apparatus of the class described, the combination of a support, a platen mounted thereon, a shuttle rotatably mounted on said support, means for supplying materials to said platen, a material supply means on said shuttle, means for rotating said shuttle to wind the material thereon around the first mentioned materials, a stationary guide roller on said shuttle around which the last mentioned material runs, a movable guide roller on said shuttle between said stationary roller and the material supply means on said shuttle and over which the last mentioned material runs, a brake engaging the material supply member and connected to the movable roller, and a spring acting on said movable roller in a direction opposite to the tension of the material as it unwinds from its supply means and in a direction to apply said brake, and means for consolidating said materials.

13. An apparatus as claimed in claim 8 in which means are provided for automatically stopping the shuttle rotating means and the material supply means in the event the liner spool operates in the opposite direction due to the liner sticking to the ribbon of material.

14. An apparatus as claimed in claim 8 in which means are provided for automatically stopping the shuttle rotating means and the material supply means in the event the ribbon material becomes exhausted.

15. An apparatus as claimed in claim 8 in which means are provided for automatically stopping the shuttle rotating means and material supply means with the shuttle in a predetermined position in the event the ribbon material becomes exhausted.

In testimony whereof, I have hereunto subscribed my name.

HOWARD I. MORRIS.